United States Patent [19]

Hanemaayer

[11] Patent Number: 4,685,719
[45] Date of Patent: Aug. 11, 1987

[54] CONVERTIBLE SITTING-SLEEPING ARRANGEMENT FOR RECREATIONAL VEHICLE

[75] Inventor: Jacobus N. Hanemaayer, Kitchener, Canada

[73] Assignee: Hanmar Home Equipment Limited, Ontario, Canada

[21] Appl. No.: 792,209

[22] Filed: Oct. 28, 1985

Related U.S. Application Data

[63] Continuation-in-part of Ser. No. 409,549, Aug. 19, 1982, Pat. No. 4,550,946, which is a continuation-in-part of Ser. No. 348,695, Feb. 16, 1982, abandoned.

[30] Foreign Application Priority Data

May 26, 1982 [CA] Canada .................................. 403776

[51] Int. Cl.$^4$ .......................... B60P 3/38; B60R 1/10; A47C 17/16
[52] U.S. Cl. .................................... 296/156; 296/164; 296/69; 5/18 R; 5/118; 297/63
[58] Field of Search ................ 296/69, 174, 156, 164; 5/12 R, 17, 18 R, 37 R, 39, 59 R, 59 B, 59 C, 118; 297/63; 16/268, 269

[56] References Cited

U.S. PATENT DOCUMENTS

| | | | |
|---|---|---|---|
| 368,472 | 8/1987 | Heringshausen | 5/59 R X |
| 1,542,854 | 6/1925 | Carlson | 296/69 X |
| 1,832,767 | 11/1931 | Dameron | 296/156 |
| 2,244,136 | 6/1941 | Zercher | 16/268 |
| 2,320,614 | 6/1943 | Kleine | 296/24 R X |
| 2,370,851 | 3/1945 | Eppenstein | 5/17 |
| 2,558,470 | 6/1951 | Vandermark | 296/174 X |
| 3,140,114 | 7/1964 | Stephenson et al. | 296/69 |
| 3,282,625 | 11/1966 | Logan | 296/69 X |
| 3,463,539 | 8/1969 | Racine et al. | 296/174 |
| 3,567,272 | 3/1971 | Low | 296/156 |
| 3,867,730 | 2/1975 | Wright | 5/17 X |
| 3,916,462 | 11/1975 | Riches | 296/174 X |
| 3,948,559 | 4/1976 | Hain et al. | 297/330 |
| 4,001,901 | 1/1977 | Quakenbush | 5/37 R |
| 4,005,898 | 2/1977 | Way | 296/174 |
| 4,054,956 | 10/1977 | Quakenbush | 5/9 R |
| 4,292,697 | 10/1981 | Alembik | 297/105 X |

FOREIGN PATENT DOCUMENTS

| | | | |
|---|---|---|---|
| 693439 | 7/1940 | Fed. Rep. of Germany | 5/17 |
| 72050 | 5/1947 | Norway | 5/18 R |

Primary Examiner—Robert B. Reeves
Assistant Examiner—Dennis H. Pedder
Attorney, Agent, or Firm—Cushman, Darby & Cushman

[57] ABSTRACT

The single room interior space of a compact motorvan for most daytime living converts quickly into three private compartments by simply opening a set of dual function folding doors (movable partitions) exposing a toilet and bigger than average shower stall area (latter doubling as coat closet) and at the same time forming a central compartment, thereby automatically creating two more private compartments in front and rear. The kitchen facilities located in the central compartment, opposite from the toilet and shower/coat closet area, are used when the doors cover that area from view. This central utility compartment is always available for active use and never occupied by seats, table or beds. The four seats in the instantly creatable front compartment rapidly convert to two, wide single beds, with ample space between them for quick exit or access to the central privacy compartment. This convertible sitting-sleeping area includes a pair of front seats and a pair of rear seats, each of the seats having a seating portion and each of the rear seats further including a movable backrest. The front and rear seats are adapted to assume either a sitting mode or a sleeping mode and to accomplish this the front seat is mounted for rotation about a vertical axis while the seating portion of the rear seat is movable in a front to back direction. The backrest for the rear seat is also releasably retained in an upright position. By suitably arranging these components, conversion from the sitting mode to the sleeping mode is quickly accomplished.

10 Claims, 18 Drawing Figures

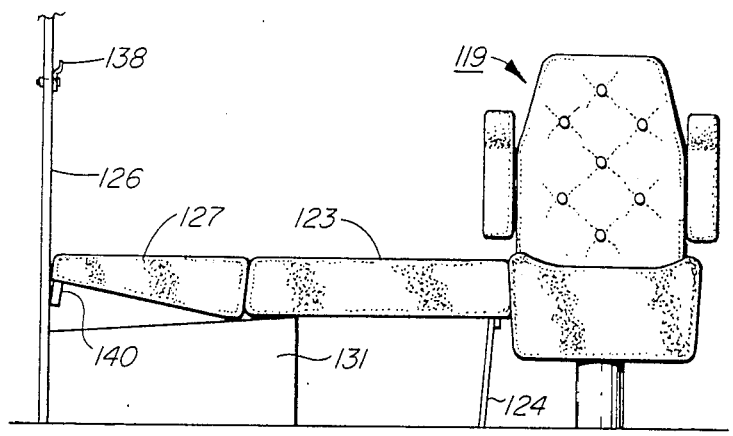
FIG. 16
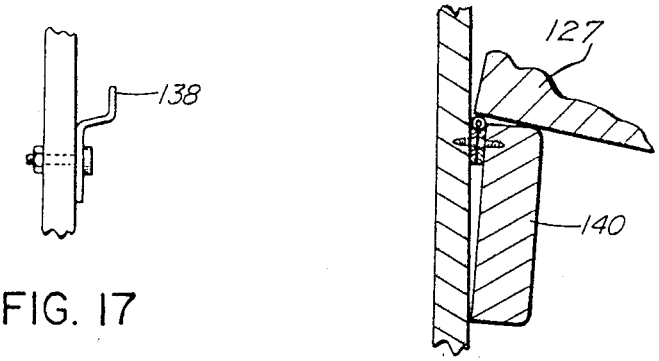
FIG. 17
FIG. 18

CONVERTIBLE SITTING-SLEEPING ARRANGEMENT FOR RECREATIONAL VEHICLE

CROSS-REFERENCE TO RELATED APPLICATIONS

This application is a continuation-in-part of U.S. Ser. No. 409,549 filed Aug. 19, 1982, now U.S. Pat. No. 4,550,946 which, in turn, is a continuation-in-part of U.S. Ser. No. 348,695 filed Feb. 16, 1982, abandoned.

BACKGROUND OF THE INVENTION

This invention relates to a recreational vehicle or motor van, and more particularly, to a recreational vehicle having an area convertible from a travelling-sightseeing mode to a sleeping mode.

Although large motor homes and trailers have been in use for a number of years, recent increases in fuel costs have created a need for more compact motor homes capable of providing all of the amenities of the larger motor homes but at a saving in fuel cost and space. Other considerations are greater flexibility and greater ease of handling. The ideal motor home would represent a compromise of these features and contain an interior allowing for both a single living space during the major part of the travelling day and division of that living space during the remainder of the day into separated compartments for specialized activities such as sleeping, cooking and personal hygiene.

Certain features are essential in a motor van being utilized as a motor home. It must contain comfortable seating for travelling, suitable kitchen facilities such as a stove and fridge, a toilet, a shower or similar wash facility, and sleeping quarters. Depending upon the space available in the motor van, one or more of these features may be placed in the same section of the van.

SUMMARY OF THE INVENTION

The subject invention relates to recreational vehicle or a motor van having an interior arranged to form a motor home that takes optimum advantage of the available space. Such vans may be provided in various lengths, their interior being separable into either two or three compartments depending upon available space. The forward compartment, in accordance with the invention, contains a seating arrangement convertible into several beds in the fashion described and claimed hereafter. In that same compartment, a stowable, overhead bed may be provided, that bed in its extended position resting on support means above the seating arrangement. If the length of the van allows, a fixed bed may also be installed in the separable rear compartment.

In the longest version of the motor van to be described hereafter (and described and claimed in U.S. Ser. No. 409,549, now U.S. Pat. No. 4,550,946), both central and rear separable compartments are provided. In the shortest version of the motor van only forward and rear separable compartments are provided. Intermediate size versions of the motor van are also available. A kitchen facility, toilet, and shower stall occupy the central separable compartment in the longest version of the motor home, such facilities being in the rear compartment in the shortest version of the motor van. The kitchen facility has a balanced weight distribution and a preferred embodiment of the invention comprises a sink, a grill area, a fridge, kitchen cabinets and overhead cupboards. The toilet is preferably of the conventional type for motor homes and connects to a waste storage tank mounted under the floor of the van. The shower stall is of a unique construction and has a fold-out coat rack assembly pivotally connected to its frame so as to double as a storage closet. The toilet and shower stall are located in what is broadly termed a toilet region and are associated with attractive cabinet coverings which double as foldable partitions to isolate those facilities in use from the remaining space in the van.

The present invention is particularly directed to a recreational vehicle having in a forward section thereof a convertible sitting-sleeping area comprising a front seat and a rear seat, each of the seats having a seating portion, and said rear seat being adapted to assume either a sitting mode or a sleeping mode and including: means for supporting the front seat for rotation about a vertical axis; means for supporting the rear seat so that its seating portion is movable in a front-to-back direction; means for releasably retaining the backrest of the rear seat in an upright position; when in the sitting mode the front seat having a rotational position facing forwardly of the vehicle body with the rear seat being situated behind and suitably spaced from the front seat and, when in the sleeping position, the front seat having been rotated about said axis so as to face the adjacent side of the vehicle with the rear seat having been moved forward on its supporting means so that the seating portion thereof is adjacent the seating portion of the front seat, and said movable backrest having been released from the upright position and located horizontally immediately behind the seating portion of the rear seat so that the seating portion of the rear seat is located intermediate said movable backrest and the seating portion of the front seat and all being arranged such that their upper surfaces lie in generally co-planar relation to one another to form a bed extending from front to back of the sitting sleeping area, and wherein a spacer-support means is associated with said backrest, said spacer-support being movable from a first position in the sitting mode wherein it engages a lower portion of the backrest to maintain it at a selected angle of incline to a second position in the sleeping mode wherein it serves to support that end of the backrest which is remote from the seating portion of the rear seat when in said generally horizontal position.

In a further aspect said spacer-support is pivotally mounted for movement from the first position to said second position and is arranged to rest on a rearward part of the seating portion of the rear seat to maintain same in said first position, and to hang downwardly from its mounting when in the second position such that its upper edge provides said support for the end of the backrest.

In a still further aspect said backrest is provided with loop means and a hook means engaged with said loop means and secured to a fixed structure of said vehicle and together providing said means for releasably retaining the backrest in the upright position, said hook and loop means cooperating with one another to prevent their disengagement except when said backrest has been swung outwardly toward a generally horizontal position.

Further aspects of the invention will be apparent from the following description and the appended claims.

BRIEF DESCRIPTION OF THE DRAWINGS

The subject invention will now be described in greater detail by way of example. In the drawings:

FIG. 16 is a view similar to that of FIG. 11 but illustrating the "sleeping" mode;

FIGS. 17 and 18 are views similar to those of FIGS. 12 and 13 but illustrating the arrangement in the "sleeping" mode.

DETAILED DESCRIPTION

Figure 1:
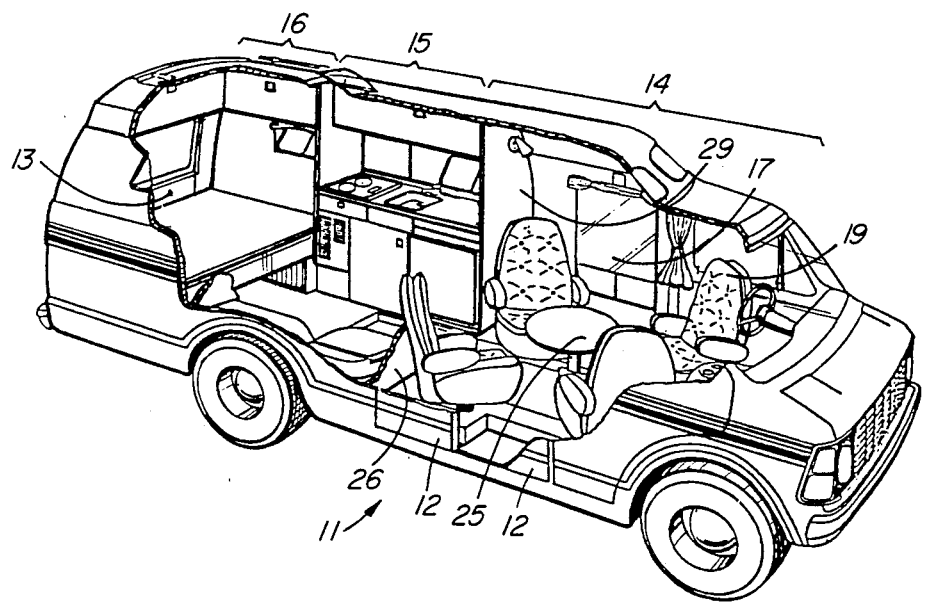
FIG. 1 is a perspective cutaway view of the right side of the longest version of the motor van.

A preferred embodiment of the motor van of the subject invention will next be described utilizing the accompanying drawings.

Motor van 11 has the chassis and body of one of the vans commercially available in the marketplace. The van interior fixtures of the subject invention are adopted to be placed in a Dodge "Ram Series 250" van, although other vans available in the marketplace could be utilized to house the same or similar fixtures. Preferably, the chosen van will have an engine economic on gas, power steering, power brakes, and other features that contribute to a smooth comfortable ride, such as cruise control, steel belted tires, and a stabilizer bar.

The van of the preferred embodiment has side doors 12 and a rear door 13 to allow passengers rapid access to the van interior. Three separable sections or compartments are created in the motor van of FIGS. 1 and 2: a forward compartment 14, a central compartment 15, and a rear compartment 16, such sections or compartments being serially arranged in the lengthwise direction of the van body and being in close juxtaposition to one another. In a shorter version of the motor van of the subject invention there are only two compartments: a forward seating compartment and a rear compartment, the rear compartment containing fixtures similar to those that will subsequently be described in central compartment 15.

Figure 2:
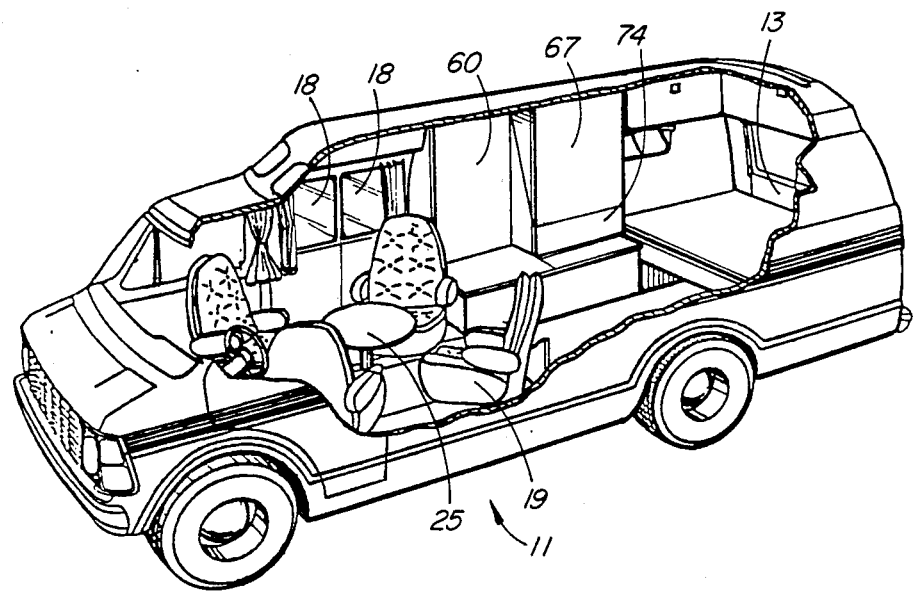
FIG. 2 is a cutaway perspective view of the left side of the motor van of FIG. 1.

Forward compartment 14 represents approximately half of the interior space of the van and has side windows 17 and 18 in addition to the standard windows to allow passengers seated in the forward compartment a panoramic view outside. FIGS. 1 and 2 illustrate four swivel seats 19 mounted in the forward compartment; however, as illustrated in FIGS. 5 to 8 inclusive, the two rear swivel seats may each be replaced by a fixed seat 20 which, in conjunction with the swivel seat forward thereof, may be converted into a bed as will subsequently be more fully explained. A table 25 is removably mounted in the forward compartment 14 such that it is central to either of the four swivel seats 19 or of the pair of front swivel seats 19 and the pair of fixed rear seats 20. The table may be eccentrically mounted to its support post and off centered relative to the floor to provide extra room when rotated out of its normal position. For driving all swivel seats are in the forward position and table 25 could be detached from the floor and stored if desired.

Figure 5:
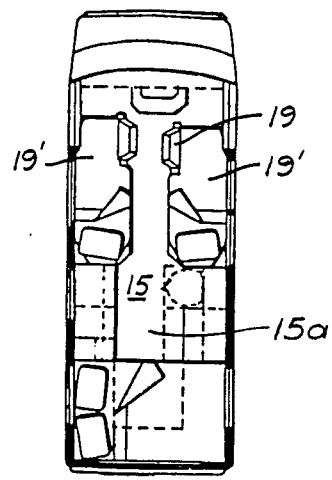
FIG. 5 is a plan view of the motor van interior of FIG. 4 illustrating a pair of beds formed by the convertible seating arrangement in the front area and either a fixed double bed in the rear area or a bed which is convertible to a dinette as shown in FIG. 4.
Figure 6:
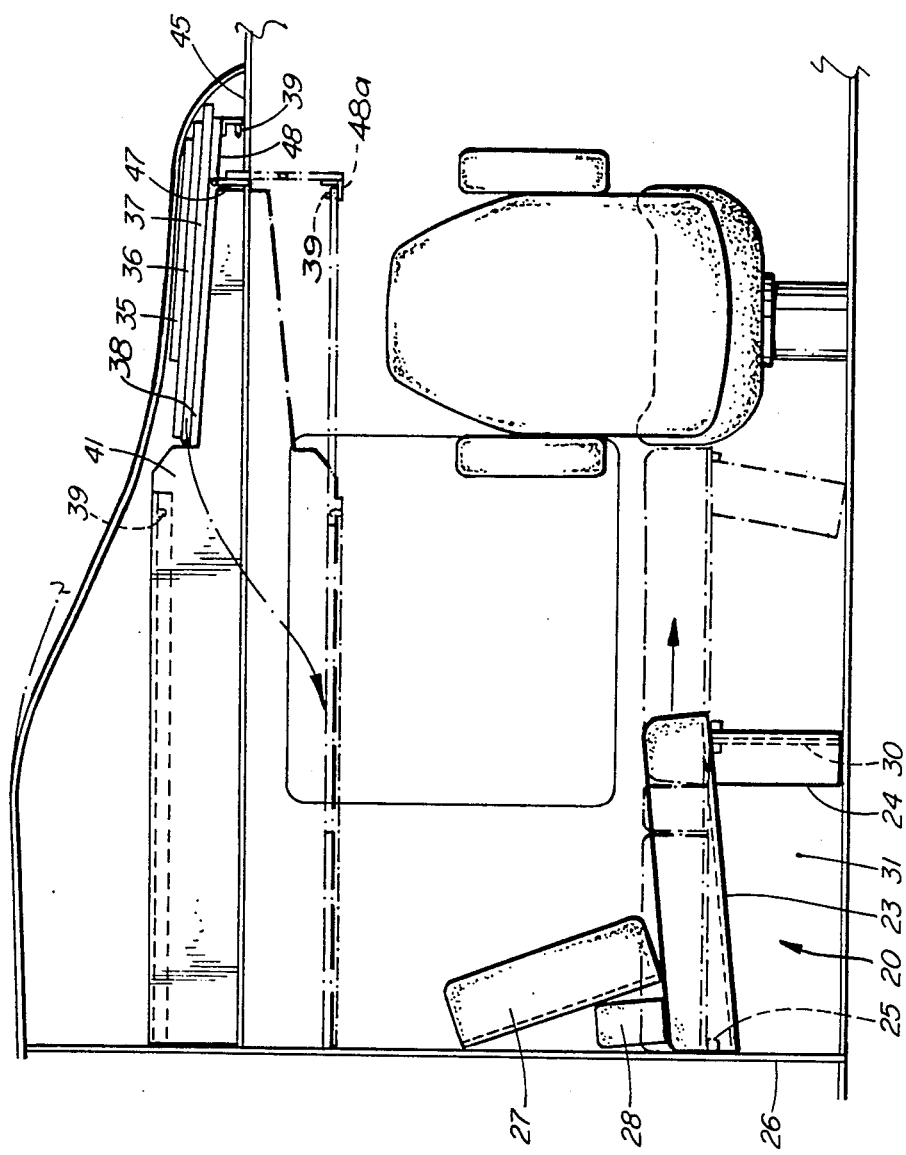
FIG. 6 is a cutaway view through the right side of the motor van illustrating the convertible seating arrangement and also illustrating the stowable, overhead bed.

FIGS. 3 to 6 illustrate a seating arrangement convertible to a pair of beds. Each bed 19' is formed by a forward swivel seat 19 and the associated fixed seat 20 located at the rear thereof. To form a bed, the swivel seat is rotated such that its back portion is proximate of the other swivel seat and its arms, which are pivotally connected to the back portion, are in the raised position (see FIG. 6). The fixed seat 20 which is behind the particular swivel seat 19 is modified to form an extended horizontal platform for the bed, as shown in outline in FIG. 6. Seat 20 has a seating portion 23 to which is rigidly secured at the forward end a vertical front plate 24. The side edges of seating portion 23 rest on a pair of forwardly extending vertical frame walls 31. A back rest 27 is provided with loops on its upper edge which fasten to hooks mounted on partition 26. Back rest 27 slopes downwardly away from partition 26, its lower portion being spaced from partition 26 by a cushion 28. As shown in FIG. 6, seating portion 23 of each rear seat 20 may be moved forward such that its front edge is adjacent to a side edge of the rotated swivel seat forwardly thereof. The rear edge of seating portion 23 in such forward position is supported by vertical frame support 30, that support sitting proximate of vertical front plate 24 when seating portion 23 is in the retracted position. With seating portion 23 in the forward position, back rest 27 is dislodged from the hooks that hold it to partition 26 and laid on a horizontal strip 25 rigidly secured to the partition 26 which separates the forward compartment from the adjoining compartment. The top edges of the pair of forwardly extended vertical frame walls 31 are covered by seating portion 23 and support the latter when in the retracted position. On the driver's side of the van, the two cushions 28 are placed on a support bridging the span between side walls 31 between seating portion 23 in its forward position and back rest 27 to form the bed; the driver's swivel seat is positioned slightly forwardly of the other swivel seat and the other bed does not require similar cushions. FIG. 6 illustrates in outline the bed formed on the driver's side by the rear seat in the extended position and by the rotated swivel seat forward thereof, that swivel seat having been rotated counter-clockwise one-quarter turn and its arms pivoted to the raised position. FIG. 5 illustrates the two beds 19' that are thus formed in the forward compartment, the bed on the driver's side being of slightly greater length. The relatively wide seating portion 23 (as compared with backrest 27 and the seating portion of the forward seat) which forms the central portion of the bed provides extra room for the sleeper where it is most needed. Suitble means, not shown, are provided to lock the swivel seats 19 in their forward, driving positions whereby to prevent unwanted turning of same about their vertical swivel axes. The space between vertical walls 31 under seating portion 23 in the retracted position is normally used to store bedding and similar items.

Figure 7:
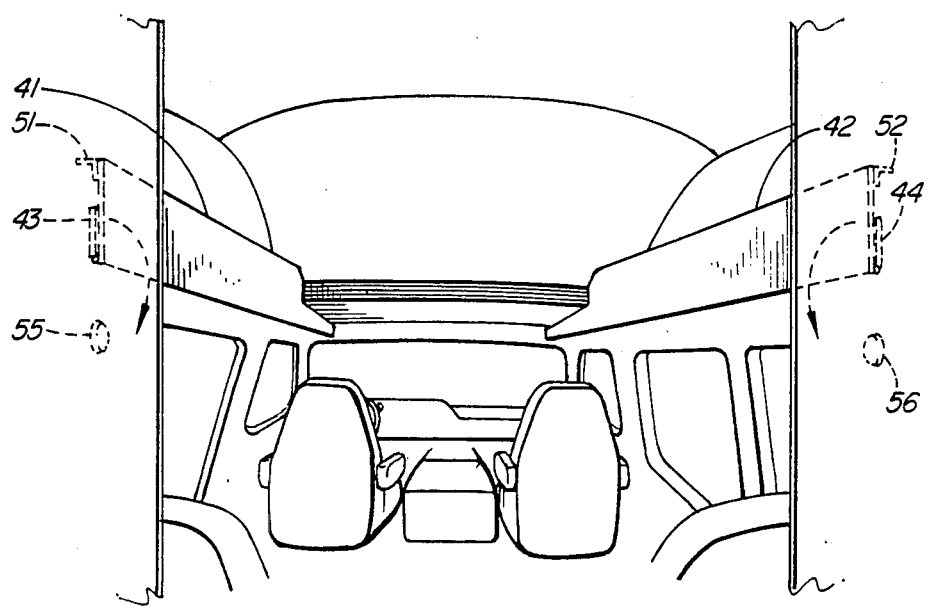
FIG. 7 is a perspective forward view of the forward compartment illustrating the stowable, overhead bed in the retracted position.
Figure 8:
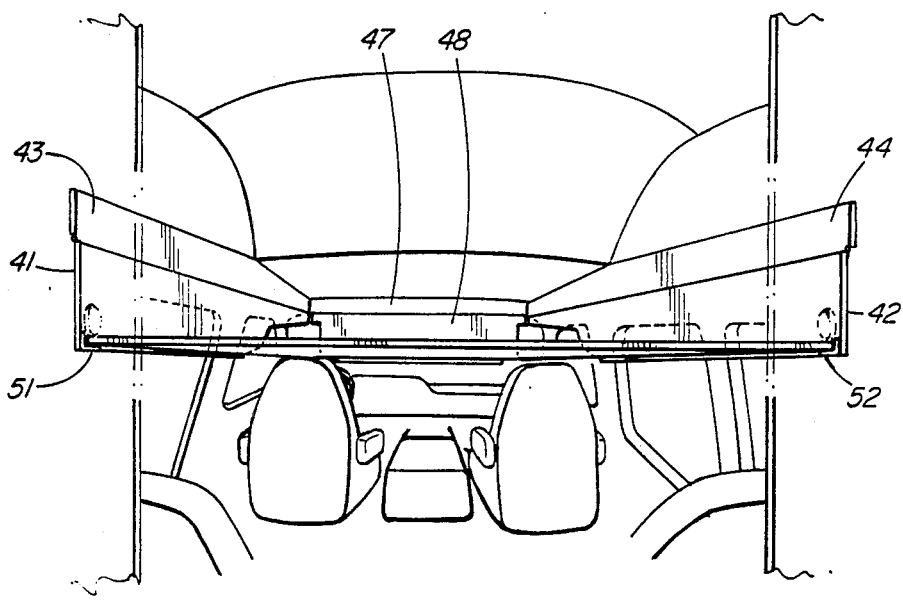
FIG. 8 is a perspective forward view of the forward compartment illustrating the stowable, overhead bed in the extended position.

An alternate bed arrangement for the forward compartment of the van is illustrated in FIGS. 6, 7, and 8. The alternate arrangement, which finds greater application to a van housing four swivel seats in the forward compartment, is a stowable overhead bed comprising three boards 35, 36, and 37, each of similar length but of different width, board 37 being wider than board 36 which is wider than board 35. The three boards together form the base of the stowable bed, the boards being supported by three fold-down support members, two of which are each pivotally secured to a respective side of the van above the windows and the third of which is pivotally secured to a horizontal shelf at the forward end of the van. The support members pivotally secured to the side walls of the van are boards 41 and 42 which are hinged to boards 43 and 44, respectively, the latter pair of boards being permanently mounted to a respective one of the side walls of the van. The support member at the forward end of the van is pivotably mounted to the rearward edge of horizontal shelf member 45 which extends laterally across the van proximate of the top of the windshield. The forward support member consists of two boards hinged together such that in their retracted position a first one of the boards 47 extends generally vertically and the other board 48 extends generally horizontally. The hinges on boards 47 and 48 are positioned such that with boards 35, 36, and 37 unstowed, boards 47 and 48 may be pivoted as a unit on the hinge connecting board 47 to the rearward edge of horizontal ledge 45. That hinge, which in the stowed bed position is on the lower edge of board 47, is on the upper edge of board 47 after such rotation. Board 47 is then rotated relative to board 48 until the two boards hang in vertical planar alignment (as shown in dashed lines in FIG. 6). Boards 41 and 42 may assume either a raised position, as shown in FIG. 7, or a lowered position, as shown in FIG. 8; the two boards have angle iron members 51 and 52, respectively, secured to their lower edges as those edges are defined in the lowered position. This arrangement is illustrated in FIGS. 7 and 8. Board 48 also has a length of angle iron 48a extending along its lower edge and best seen in the lowered position (shown in dashed lines in FIG. 6). The boards 35, 36 and 37 rest upon the three sections of angle iron 48a, 51 and 52, as illustrated in outline in FIG. 6. Of boards 35, 36 and 37, the board placed in the forward position has holes extending through its thickness on one of its longer edges and on the two corners facing that edge. Pins 39 located to correspond to the holes in the forwardly positioned board extend from the three sections of angle iron such that placement of the pins 39 into the holes on the forwardly positioned board locks the forward and side support members in a defined spatial relationship. Boards 41 and 42 are thus prevented from moving laterally outward and board 48 is prevented from moving forwardly. The position of pins 39 and the corresponding holes in the forwardly positioned board are illustrated in FIG. 6. Stops 55 and 56 are each fastened to partitions 29 and 26 respectively at the rear edges of boards 41 and 42, respectively, to further prevent those boards from moving outwardly.

Boards 41 and 42 serve a double purpose for the storable bed. Not only do they support boards 35, 36 and 37 when those three boards are in their lowered position, but they also prevent those three boards from sliding back when in their raised position. As shown in FIGS. 6, 7 and 8, boards 41 and 42 are cut such that their forward ends are of decreased depth to match with a ledge defined by strips 38; boards 35, 36 and 37 rest upon these strips 38 which are permanently mounted to the forward ends of permanently mounted boards 43 and 44. All of the hinges used in the stowable bed assembly are preferably of the piano hinge variety and extend the length of the hinged surfaces thus providing ample support when the bed is in use.

Figure 3:
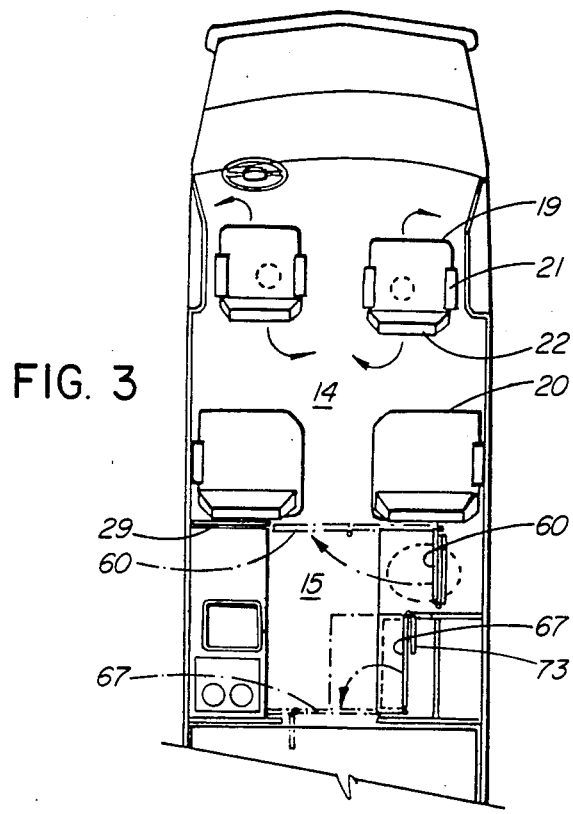
FIG. 3 is a plan view of the motor van interior illustrating a seating arrangement convertible to a pair of beds and also illustrating the toilet and shower stall covering pivoted to form a privacy compartment.
Figure 4:
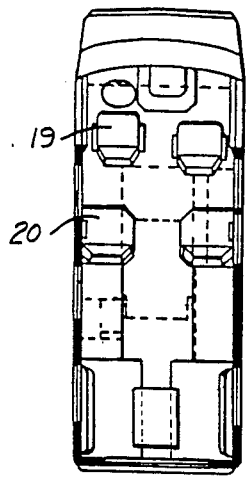
FIG. 4 is a plan view of a motor van interior as in FIG. 3, and additionally illustrating a rear dining compartment which is convertible to a double bed as shown in FIG. 5.
Figure 9:
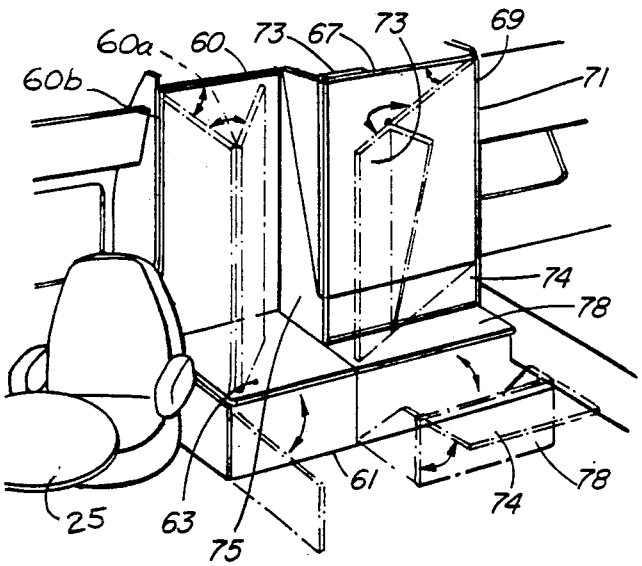
FIG. 9 is a perspective view of the covered toilet and shower stall facility of the motor van, illustrating in outline a partial fold-out position for the covering.
Figure 10:
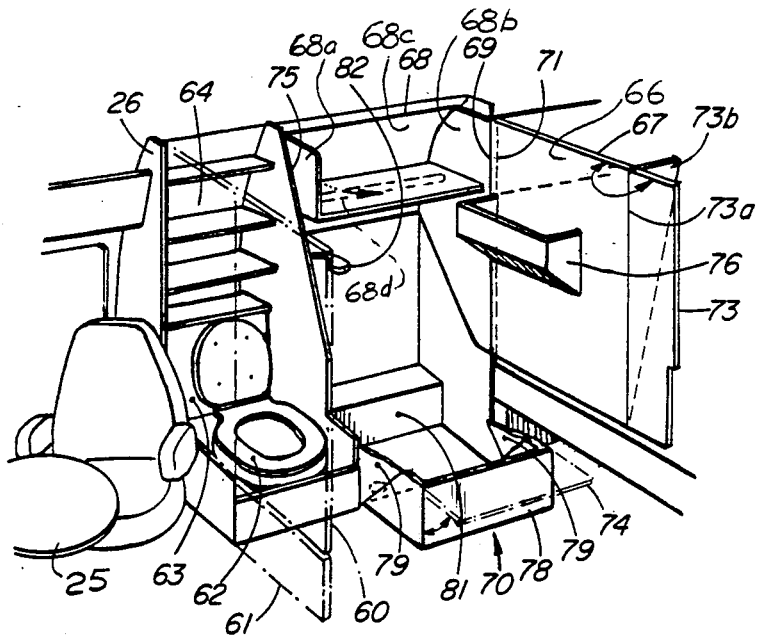
FIG. 10 is a perspective view of the toilet and shower stall facility after movement of the covering to a position to form a separated privacy compartment.

The separable privacy compartment behind the forward compartment, as illustrated in FIGS. 1, 2, 3, 9 and 10, will now be described in detail. For better clarification, the separable privacy compartment is designated as region 15 of the van of FIG. 1. That compartment defines on one side a toilet region which contains a flush toilet and an adjoining shower stall and coat rack facility, as well as an oppositely disposed kitchen facility all of which are mounted either to or alongside the side walls of the van body. A longitudinally extending passageway 15a (FIG. 5) extends through such compartment and provides communication between the main compartments or sections 14, 15 and 16 of the van. The toilet region may be considered as extending the full length of the central compartment 15 adjacent an associated sidewall of the van. The folding doors which define partitions movable from positions covering and concealing this toilet region (and the facilities therein) from view, to other positions wherein such toilet region, and its facilities, are opened and exposed for use, will now be described. The upper portion of the toilet is covered by a folding door 60 having a pair of panels of substantially similar size hinged together along their long edges by hinge 60a and which can be unfolded, as shown in FIGS. 3 and 10 to extend from partition 26 (to which door 60 is hinged as seen in FIGS. 3, 9 and 10) by hinge 60b to partition 29 which abuts the forward end of the kitchen facility. With folding door 60 in the folded condition its two panels overlie one another in a plane recessed from the front of the toilet, and blocking use of the toilet, with the hinges which support the two panels being located at opposite sides of the toilet region as seen in FIGS. 3 and 9. With folding door 60 in the extended position, front cabinet panel 61 may be pivoted on the hinge extending vertically on its edge to assume a position in coplanar alignment with the extended folding door 60. This is illustrated in FIG. 10. A sliding panel (not shown) can be slidably secured to the front cabinet panel 61 such that extended folding door 60 and front cabinet panel 61 essentially present a uniform wall to the forward compartment of the van. As mentioned, this wall extends laterally in the van such that its outer edge is proximate the edge of the fixed partition 29 (see FIG. 3). Flush toilet 62 is of a conventional design for motor homes and is connected to a waste storage tank located under the floor of the motor van. Top cabinet panel 63 of the toilet is rigidly secured to the toilet seat and can be pivoted to an open position when folding door 60 is in the extended position. As shown in FIG. 10, the toilet has shelves 64 mounted thereabove, those shelves being utilized for storing toiletries and similar materials.

When the folding doors 60, 67, are in their extended positions to form the central privacy compartment, the space in front of the toilet region, including the passageway 15a and the kitchen facility, is effectively converted into useable space, providing extra room for person(s) using the privacy compartment.

The central compartment 15 is also separable from the rear compartment 16 of the van by means of a foldable door 67 as shown in FIGS. 3, 9 and 10 and comprising a large door panel 66 and a small panel or leaf 73. Foldable door 67 is pivotally connected to fold-out coat rack assembly 68 by vertically extending piano hinge 69 which extends parallel to the hinge 60b of folding door 60. Coat rack assembly 68 is in turn pivotally connected to the frame of shower stall 70 by vertically extending piano hinge 71 which extends parallel to and slightly rearwardly on the van from hinge 69. Foldable door panel 66 has the leaf 73 pivotally connected thereto by a piano hinge 73a, leaf 73 extending vertically along the outer edge of foldable door panel 66 and a wedge shaped panel 73b is fixed to the same edge as hinge 73a is fixed but it is on the outside. Panel 66 is sufficiently wide as to cover the entire front face of the shower stall. Leaf 74 extends horizontally along the upper edge of the foldable base portion 78 of the shower stall and is connected thereto by a piano-type hinge. When foldable door 67 is in its closed position, its leaf 73 folds in behind the door panel 66, as shown in FIG. 9, and wedge-shaped panel 73b butts up to the sloping partition 75 which separates the toilet from the shower stall. A deep tray 76 is secured to the back surface of folding door 67.

Fold-out coat rack assembly 68 consists of a shelf surrounded by a pair of side panels 68a, 68b and a rear panel 68c, as shown in FIG. 10. The side panel 68b to which piano hinge 69 is fastened extends approximately two-thirds the height of the shower stall, the other side panel 68a extending only upwardly from the shelf to the top of the shower stall. The back panel extends downwardly behind the shelf at an angle, as shown in FIG. 10, all of the panels of the coat rack assembly being so positioned to fit into the shower stall, which is shaped to conform to the side of the van. A coat rack 68d (shown in dashed lines in FIG. 10) is secured to the underside of the shelf of the coat rack assembly.

Shower stall 70, as shown in FIG. 10, may be of a moulded rigid plastic construction or of a plastic-plywood laminate. The shower stall has an integral foldable base portion 78 connected to its main portion by a flexible piece of vinyl 79. The flexible vinyl piece extends across a V-shaped cut in each side of the lower part of the shower stall. The front base portion of the shower stall is rotatable between an upper retracted position (wherein it is located generally below the foldable door 67 to form a lower cover for the shower stall) along a fold line connecting the apices of the V-shaped cuts, to an extended horizontal position for use closely adjacent to or on the floor of the motor van. The fold line is defined by a hinge and the vinyl 79 is of one piece and extends completely across the assembly to cover the hinge and prevent leakage of water. The lower main portion of the shower stall has a seat 81 integrally formed therein, shower head 82 being mounted on a flexible shower hose for ease of handling by a person seated on seat 81. A shower curtain (not shown) is detachably secured to a plurality of clips (which may be Velcro-covered knobs) on the ceiling of the van and hangs such that its lower end is inside of the base portion of the shower stall. When the shower stall is no longer required, coat rack assembly 68 is rotated back into its position in the shower stall and the shower curtain (not shown) rests against the back panel of the coat rack assembly. Fasteners are employed to hold folding door 60, foldable door 67 and fold-out coat rack assembly 68 in either their closed or extended positions.

The rear compartment of the van may be utilized for several different functions. Firstly, it may house a fixed bed as shown in FIGS. 1 and 2. Alternatively, it may house a bed convertible into a central table with a bench along each side of the van (see FIGS. 5 and 4). It is also possible to have a permanent dinette arrangement in the rear portion of the van. In that compartment, overhead cabinets are provided for storing bedding, table linen and similar items.

The foregoing description has related to the longest version of the van to which the features of the subject invention are applicable. However, it should be obvious that the features of the invention could also be repositioned so as to be accommodated in a van of shorter length. For instance, a shorter van might have only the contents of the forward and central compartments of the described embodiments. Or a shorter version of the van might not have a shower stall in the toilet region, instead having a regular clothes closet or other feature. It should be noted that when no shower is installed, door 67 and leaf 73 extend all the way to the floor. In that situation, door 60 is brought forward several inches into line with door 67 and wedge panel on leaf 73 omitted as the sloping partition 73 is not there. The toilet is then moved back the same distance; the shelves behind it and the partition separating the toilet and shower stall are eliminated and door 60 brought down to the floor all the way as well so that lower door 61 can be eliminated also. In other words, the toilet and clothes closet are both placed in the same enclosure or toilet region with the two sets of folding doors being used to create the partitions. It is also possible for a dinette to be placed along one of the side walls of the van, replacing one of the rear seats in the forward compartment and also a portion of the central compartment.

A modified form of seating arrangement convertible to a pair of beds will now be described. The overall arrangement is similar to that described above with reference to FIGS. 3 to 6. Accordingly, components similar to those described previously will be identified with the same reference characters preceded by the digit "1". For example, character "19" becomes "119".

Figure 11:
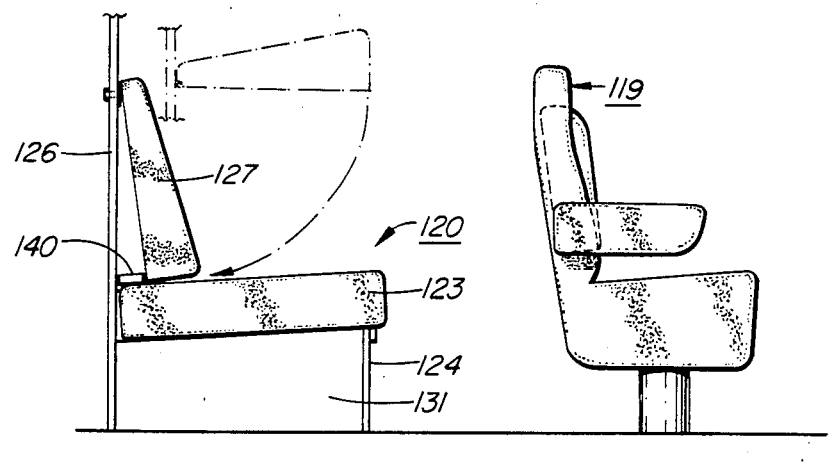
FIG. 11 is a side elevation view of a modified form of front seating arrangement convertible into a pair of beds, and illustrating the "sitting" mode.
Figure 12:
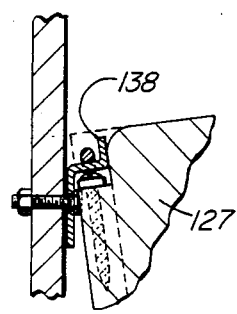
FIGS. 12 and 13 are vertical section views of the rear backrest hook support and multi-function hinged board arrangement in the "seating" mode.
Figure 13:
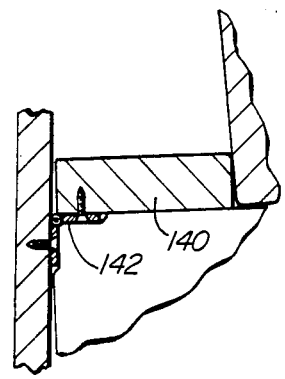
Figure 14:
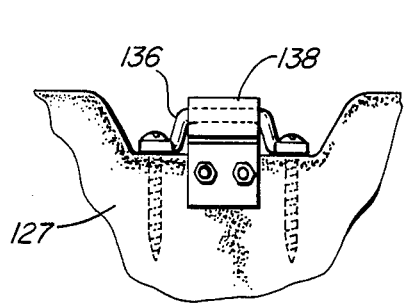
FIGS. 14 and 15 are frontal views further illustrating the rear backrest hook support.
Figure 15:
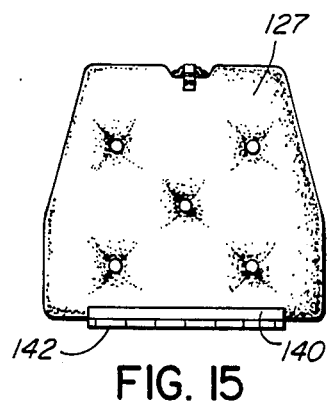

With reference to FIG. 11, the seating mode is illustrated. Seating portion 123 is shown as resting on the vertical frame walls 131, the upper edges of which slope slightly rearwardly and downwardly such that the seating portion top surface is at a comfortable seating angle. The backrest 127 (of a somewhat wedge-shaped profile) is secured at its upper edge to partition 126 by way of loop 136 secured to the edge of backrest 127, which loop engages with hook 138 firmly secured to partition 126. As seen in FIG. 12 the hook and loop structures co-operate with one another to prevent the backrest from moving upwardly and unhooking when in the sitting position. The lower edge of the backrest 127 is spaced from the partition 126 by a selected amount to maintain the backrest at a comfortable seating angle. This spacing is maintained by way of a spacer-support board 140 which is pivotally secured to partition 126 by way of a piano-type hinge 142. The spacer-support 140 is of a length as to span a substantial part of the backrest width. The spacer-support is sufficiently wide as to maintain the desired backrest angle as shown in FIG. 11. The spacer-support thickness is also a factor, since, as shown in FIGS. 16 and 18, the spacer-support 140 serves as a support for the backrest 127 when in the horizontal bed position or sleeping mode; it must therefore be thick enough so that its upper edges provides a sufficiently broad support ledge.

The manner of use of the overall convertible seating-sleeping arrangement is similar to that described previously with important exceptions to be noted below. To convert to the sleeping mode the front swivel seats 119 are rotated about their vertical support axes and their arm rests raised.

The backrests 127 are then swung upwardly to the dashed line positions of FIG. 11 thus allowing them to be unhooked from hooks 138, it being noted here that loops 136 and hooks 138 are arranged to prohibit such unhooking except when in the dashed line position of FIG. 11. Then, the seating portions 123 are moved forwardly into abutting relation with swivel seats 119, this action bringing such seating portions 123 into horizontal positions by virtue of the fact that the front portions of vertical walls 131 are of height equal to the height of the vertical front member 124. The spacer-support 140, which up to this time had been resting on the upper rear surface of seating portion 123 (thus assisting in retaining seating portion 123 in position), is then swung downwardly via its hinge 142 into parallelism with partition 126. The backrest 127 is then placed in a horizontal position with its frontal thick-end abutting seating portion 123 and supported by walls 131 and its thinner end being supported on the spacer-support 140. The spacer-support 140 is located on partition 126 at a height such that in the last-noted position, the upper surface of the backrest is substantially co-planar with the top of seating portion 123 thus helping to provide a comfortable sleeping arrangement.

The above-described arrangement is convenient and easy to use in converting from the sleeping mode to the sitting mode and vice versa. The need for the extra cushion 28 in the previously described arrangement is eliminated. Multiple functions are accomplished with a minimum of structure, thus keeping initial costs low and maintenance problems to a minimum.

I claim:

1. A recreational vehicle having in a forward section thereof a convertible sitting-sleeping area comprising a front seat and a rear seat, each of the seats having a seating portion, and said rear seat further including a movable backrest; the front and rear seats being adapted to assume either a sitting mode or a sleeping mode and including:

means for supporting the front seat for rotation about a vertical axis;

means for supporting the rear seat so that its seating portion is movable in a front-to-back direction;

means for releasably retaining the backrest of the rear seat in an upright position;

when in the sitting mode the front seat having a rotational position facing forwardly of the vehicle body with the rear seat being situated behind and suitably spaced from the front seat and, when in the sleeping mode, the front seat having been rotated about said axis so as to face the adjacent side of the vehicle with the rear seat having been moved forward on its supporting means so that the seating portion thereof is adjacent the seating portion of the front seat, and said movable backrest having been released from the upright position and being located horizontally immediately behind the seating portion of the rear seat so that the seating portion of the rear seat is located intermediate said movable backrest and the seating portion of the front seat such that both of said seating portions and said backrest lie in generally co-planar relation to one another to form a bed extending within the sitting-sleeping area, and wherein a spacer-support is associated with said backrest, said spacer-support being movable from (A) a first position in the sitting mode wherein a first edge of said spacer-support, which edge becomes separated from said backrest on release of the backrest from the upright position, abuts against a lower portion of the backrest when upright to maintain the backrest at a selected angle of incline, to (B) a second position in the sleeping mode wherein a second opposite edge of said spacer-support abuts against and supports that end of the backrest which is remote from the seating portion of the rear seat when in said generally horizontal position.

2. The vehicle of claim 1 wherein said means for releasably retaining said backrest is mounted to a fixed structure of the vehicle, and said spacer-support is pivotally mounted to said fixed structure for movement from the first position to said second position and is arranged to rest on a rearward part of the seating portion of the rear seat when in the sitting mode to assist in retaining said seating portion in position and to maintain said spacer-support in said first position, and to hang downwardly from its pivotal mounting when in the second position such that said second edge of the spacer-support provides said support for the end of the backrest.

3. The vehicle of claim 2 wherein said end of said backrest is provided with loop means, and a hook means engaged with said loop means and secured to said fixed structure of said vehicle with said loop means and hook means providing said means for releasably retaining the backrest in the upright position, said hook and loop means co-operating with one another to prevent their disengagement except when said backrest has been swung outwardly toward a generally horizontal position.

4. The vehicle of claim 3 wherein said fixed structure comprises a verticle partition at the rear of said forward section, said spacer-support being pivotally secured to said partition by hinge means.

5. The vehicle of claim 2 wherein said backrest has a generally wedge-shaped profile, and said spacer-support being positioned such that an uppermost surface portion of the backrest is co-planar with upper surface portions of said seating portions when supported in said generally horizontal position.

6. A vehicle as in claim 1, wherein each rear seating portion comprises
(a) a movable unit having a first member and a second member generally perpendicular thereto secured to each other along respective ones of their edges, the first member being approximately horizontally oriented when the movable unit is utilized as a seat while the second member extends generally downwardly;
(b) a frame adapted to hold the movable unit in two alternate positions: (i) a seating position in which the movable unit sits on and is generally above the frame, and (ii) a sleeping position in which the movable unit sits generally forward of the frame and wherein the movable unit is supported at its forward end by said second member and at its rearward end by a forward part of the frame.

7. A vehicle as in claim 1 wherein the seating portion of the rear seat is wider than both said backrest and the seating portion of the front seat such that the widest portion of the thus-formed bed is in the central region thereof.

8. The vehicle of claim 1 wherein a pair of said front seats and a pair of said rear seats are provided, the front and rear seats being spaced apart laterally of the vehicle such that when they are converted into beds, said beds are spaced apart laterally of the vehicle.

9. The vehicle of claim 2 wherein a pair of said front seats and a pair of said rear seats are provided, the front and rear seats being spaced apart laterally of the vehicle such that when they are converted into beds, said beds are spaced apart laterally of the vehicle.

10. The vehicle of claim 4 wherein a pair of said front seats and a pair of said rear seats are provided, the front and rear seats being spaced apart laterally of the vehicle such that when they are converted into beds, said beds are spaced apart laterally of the vehicle.

* * * * *